United States Patent
Brkovic

(10) Patent No.: US 8,031,494 B2
(45) Date of Patent: Oct. 4, 2011

(54) METHOD AND APPARATUS FOR PROVIDING AN INITIAL BIAS AND ENABLE SIGNAL FOR A POWER CONVERTER

(75) Inventor: Milivoje Slobodan Brkovic, Carlsbad, CA (US)

(73) Assignee: Power-One, Inc., Camarillo, CA (US)

( * ) Notice: Subject to any disclaimer, the term of this patent is extended or adjusted under 35 U.S.C. 154(b) by 428 days.

(21) Appl. No.: 12/056,796

(22) Filed: Mar. 27, 2008

(65) Prior Publication Data

US 2009/0244931 A1    Oct. 1, 2009

(51) Int. Cl.
*H02M 1/00* (2007.01)

(52) U.S. Cl. .................... 363/49; 363/21.08; 323/901

(58) Field of Classification Search .............. 363/20, 363/21.01, 21.04–21.11, 49; 323/901
See application file for complete search history.

(56) References Cited

U.S. PATENT DOCUMENTS

| | | | |
|---|---|---|---|
| 4,180,852 A | 12/1979 | Koizumi et al. | |
| 4,623,960 A | 11/1986 | Eng | |
| 4,821,163 A | 4/1989 | Bloom | |
| RE34,462 E | 11/1993 | Whittle | |
| 5,579,202 A | 11/1996 | Tolfsen et al. | |
| 6,434,025 B2 | 8/2002 | Shirai et al. | |
| 6,549,436 B1* | 4/2003 | Sun | 363/44 |
| 2002/0122320 A1* | 9/2002 | Brkovic | 363/21.08 |
| 2004/0037098 A1* | 2/2004 | Konno | 363/49 |

* cited by examiner

*Primary Examiner* — Harry Behm
*Assistant Examiner* — Matthew Grubb
(74) *Attorney, Agent, or Firm* — Waddey & Patterson; Mark J. Patterson

(57) ABSTRACT

The invention relates to a switch-mode power converter including a bias circuit. A power converter power transformer includes a magnetic core. The switch-mode power converter power transformer also includes an initial bias primary winding and an initial bias secondary winding, both wound on the magnetic core, wherein the initial bias secondary winding shares at least one magnetic path in common with the initial bias primary winding. A driver is configured to drive the initial bias primary winding with high frequency pulses when enabled by an enable signal. A rectifier and capacitor are configured to provide a voltage to power a control circuit during a power converter start-up. A method provides an initial bias power for a power converter output side referenced controller, powering the output side referenced controller from the initial bias windings.

16 Claims, 10 Drawing Sheets

METHOD AND APPARATUS FOR PROVIDING AN INITIAL BIAS AND ENABLE SIGNAL FOR A POWER CONVERTER

FIELD OF THE INVENTION

This invention generally concerns isolated converter circuitry and more particularly relates to a means for providing an initial bias and enable signal to a control circuit referenced to the output of converter.

BACKGROUND OF THE INVENTION

It is a common problem in isolated converters to provide a proper bias for both primary and output circuitry, particularly during start-up or restart of the converter. Usually a controller (pulse width modulated (PWM) is one example) is on the input side and the feedback signal is provided via an opto-coupler, while synchronous rectifiers are self-driven from the transformer windings. There are two drawbacks in using this approach. First, the use of an opto-coupler generally limits the bandwidth of the regulation loop and the maximum ambient temperature and temperature of the printed circuit board (PCB) to less than about 85° C. Secondly, the self-driven synchronous approach is generally not a good solution for higher frequencies.

In addition, protection such as over-voltage protection (OVP) has to be on the output side, and might require an additional opto-isolator just for over-voltage protection. Therefore, there is an advantage to having the control circuit on the output side. One problem is to provide a needed initial bias voltage across the isolation break, before the converter is started. One possible solution is to have a separate isolated converter that will provide the bias voltage. Such a solution would require an additional magnetic core and, if realized employing planar magnetics, would consume a lot of board space.

One viable solution for providing initial bias and enable signals was described in U.S. Pat. No. 6,724,642, Method and apparatus for providing an initial bias and enable signal for a power converter, issued to the same inventor as the instant application. The '642 patent is incorporated herein by reference in its entirety. The '642 patent uses an isolated coreless transformer having windings formed in or on layers of a printed circuit board (PCB). As a coreless solution, the bias circuit of the '642 patent does not require any additional magnetic material, such as is used in conventional planar magnetic solutions. However, the windings of a coreless transformer occupy precious space on the layers of the power converter PCB, as well as limit the placement of components in the vicinity of the windings.

What is needed is a solution to the problem of how to supply bias power across an isolation barrier that uses less area on the PCB.

SUMMARY OF THE INVENTION

In one aspect, the invention relates to a switch-mode power converter including a bias circuit, including a pair of input side power terminals configured to accept power from a power source. The switch-mode power converter also includes a pair of output side power terminals configured to provide power to a load. The switch-mode power converter also includes a power converter power transformer including a magnetic core, the power converter power transformer configured to provide a galvanic break to isolate the input side power terminals from the output side power terminals of the switch-mode power converter. The switch-mode power converter also includes a control circuit disposed on the output side of the switch-mode power converter. The switch-mode power converter also includes an initial bias primary winding wound on the magnetic core. The switch-mode power converter also includes an initial bias secondary winding also wound on the magnetic core, wherein the initial bias secondary winding shares at least one magnetic path in common with the initial bias primary winding. The switch-mode power converter also includes a driver coupled to the initial bias primary winding, the driver powered by the power source, the driver configured to drive the initial bias primary winding with high frequency pulses when enabled by an enable signal. The switch-mode power converter also includes a rectifier coupled to the initial bias secondary winding to provide rectified pulses; and a capacitor coupled to the rectifier, the capacitor configured to smooth the rectified pulses, wherein the rectifier and the capacitor are configured to provide a voltage to power the control circuit during a power converter start-up.

In one embodiment, at least a selected one of the initial bias primary winding and the initial bias secondary winding is configured to provide a source of electrical power for at least one circuit of the switch-mode power converter during operation of the power converter after the start-up.

In another embodiment, the initial bias secondary winding is configured to provide electrical power to at least one circuit of the switch-mode power converter on the output side of the power converter.

In yet another embodiment, the initial bias primary winding is configured to provide electrical power to at least one circuit of the switch-mode power converter on the input side of the power converter.

In yet another embodiment, rectification is provided by a reverse protection diode of a transistor in the driver.

In yet another embodiment, both of the initial bias primary winding and the initial bias secondary winding are configured to provide electrical power to at least one circuit of the switch-mode power converter after the start-up.

In yet another embodiment, the magnetic core of a power converter power transformer includes an E shaped core.

In yet another embodiment, the initial bias primary winding and the initial bias secondary winding are both wound on the same outer leg of the E shaped core.

In yet another embodiment, the initial bias secondary winding is additionally wound around another leg of the E shaped core.

In yet another embodiment, the another leg of the E shaped core includes a center core of the E shaped core.

In yet another embodiment, the driver further includes an oscillator configured to generate high frequency pulses, wherein the driver, when enabled, drives the initial bias primary winding in response to an output of the oscillator.

In yet another embodiment, the bias circuit is further configured to receive an ON/OFF signal initiated on the input side, and the bias circuit is configured to disable the initial bias primary winding in response to an OFF state of the ON/OFF signal.

In yet another embodiment, the bias circuit is further configured to receive an ON/OFF signal initiated on the output side, and the bias circuit is configured to disable the initial bias primary winding in response to an OFF state of the ON/OFF signal.

In yet another embodiment, the high frequency pulses include a frequency of less than or equal to about 1 MHz and a duty cycle of less than or equal to 25%.

In yet another embodiment, the high frequency pulses include a frequency above 1 MHz a duty cycle of less than or equal to 50%.

In yet another embodiment, the switch-mode power converter further includes a sensing and control circuit coupled to an input side of the bias circuit, the sensing and control circuit configured to detect when the converter is not operating, the sensing and control circuit configured to commence a shorter active period where the control circuit located on the output side is enabled followed by a longer inactive period.

In another aspect, the invention features a method to provide an initial bias power for a power converter output side referenced controller, the method including: providing a pair of input side power terminals configured to accept power from a power source; providing a pair of output side power terminals configured to provide power to a load; providing initial bias windings on a power converter power transformer, the initial bias windings including at least one initial bias primary winding and at least one initial bias secondary winding, wherein the power converter power transformer galvanically isolates a power converter input side from a power converter output side; providing the output side referenced controller; driving the initial bias windings using high frequency pulses; and powering the output side referenced controller from the power source, using the initial bias windings.

In one embodiment, the step of powering the controller includes powering the controller after a converter start-up during power converter operation, wherein power is provided to the controller via the at least one initial bias secondary winding responsive to a transfer of electrical energy from the power converter input side to the power converter output side.

In another embodiment, the at least one initial bias secondary winding includes at least one winding around two or more legs of a magnetic core of the power converter power transformer and an initial bias secondary winding voltage during power converter operation is higher than an initial bias secondary winding voltage at power converter start-up.

In yet another embodiment, the method further includes the step of: providing electrical power to at least one input side referenced power converter circuit from the at least one initial bias primary winding after a converter start-up and during power converter operation.

BRIEF DESCRIPTION OF THE DRAWINGS

For a further understanding of these and objects of the invention, reference will be made to the following detailed description of the invention which is to be read in connection with the accompanying drawing. The objects, advantages and features of the invention will be more clearly perceived from the following detailed description, when read in conjunction with the accompanying drawing which illustrate by way of example the principles of the invention, in which.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

The invention pertains to a method and apparatus for providing initial bias and enables signaling across the isolation barrier of a power converter by use of specially placed windings on a power transformer core. The specially placed windings can be disposed on the isolated power transformer core such they can provide energy transfer for initial bias and enable signaling without interfering with energy transfer related to the operation of the power sections of the converter. With bias windings incorporated into the power transformer, there is no longer a need for a dedicated initial bias transformer, such as the coreless transformer of the '642 patent. PCB real-estate that would otherwise have been needed for a separate bias or enable transformer can be used for other circuits or eliminated making the PCB physically smaller.

Figure 1:
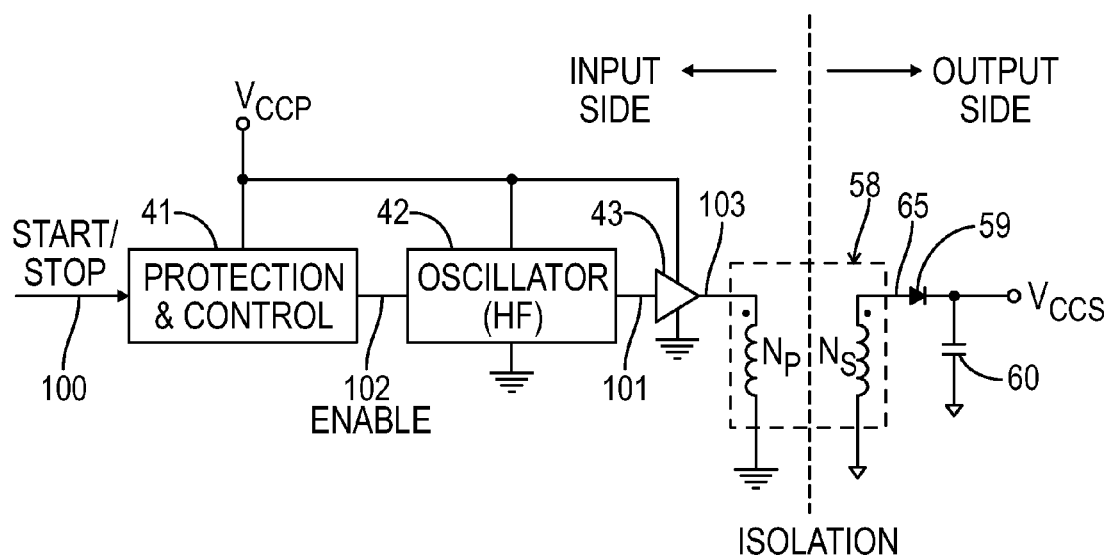
FIG. 1 shows a block diagram of an exemplary bias circuit, in accordance with one embodiment of the invention.
Figure 3:
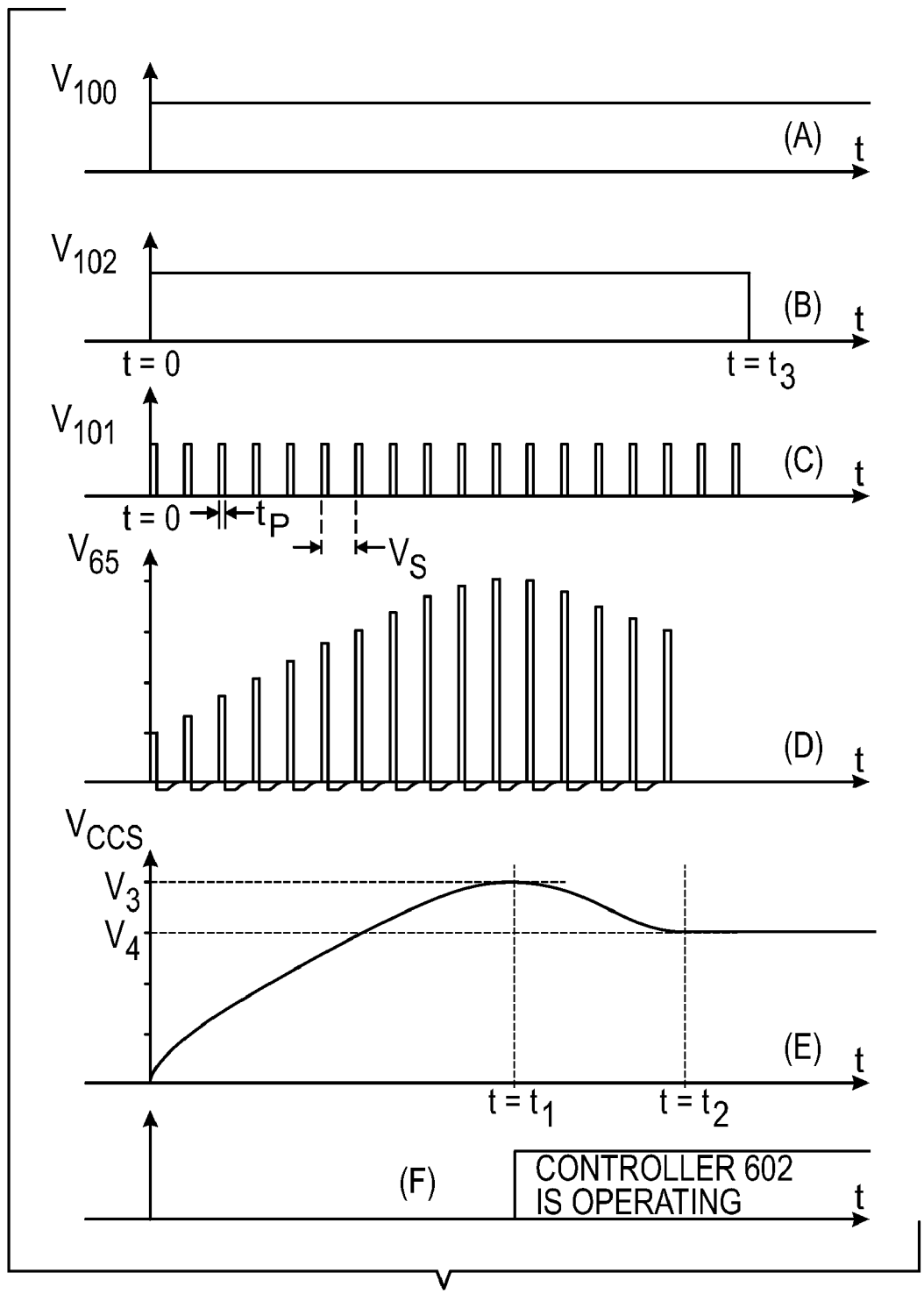
FIG. 3 shows salient waveforms of the circuit of FIG. 1.

Before describing various embodiments of the inventive bias winding configurations in detail, we first describe an initial bias circuit topology suitable for use with the inventive bias windings. With reference now to the drawings and more particularly to FIG. 1, the initial bias circuit according to one embodiment of the invention includes oscillator 42, driver 43, bias windings 58, rectifying diode 59 and capacitor 60. Oscillator 42 is controlled with ENABLE input signal 102, usually generated by protection and control circuit 41 referenced to the input side of the converter. With START/STOP signal 100 active, protection and control circuit 41 generates ENABLE signal 102 coupled to oscillator 42. When signal 102 is active (logic high, for example), oscillator 42 is enabled, and generates high frequency (for example, 500 kHz and above) pulses 101 of short duration. The frequency of pulses 101 is preferably at least about 500 kHz with a duration of, for example, about 100 nanoseconds. The short pulses 101 are fed into driver 43 which, in turn, drives specially placed windings on the magnetics of a main power transformer via primary winding $N_P$ referenced to the input side of the converter. FIG. 3 shows representative waveforms for the circuit of FIG. 1. The pulses from secondary winding $N_S$, (V65, curve (D) of FIG. 3) are referenced to the output side of the converter, and are rectified by diode 59 and fed into capacitor 60 which is charged to voltage level $V_3$ ($V_{CCS}$, curve (E) of FIG. 3), at time $t=t_1$.

Figure 2:
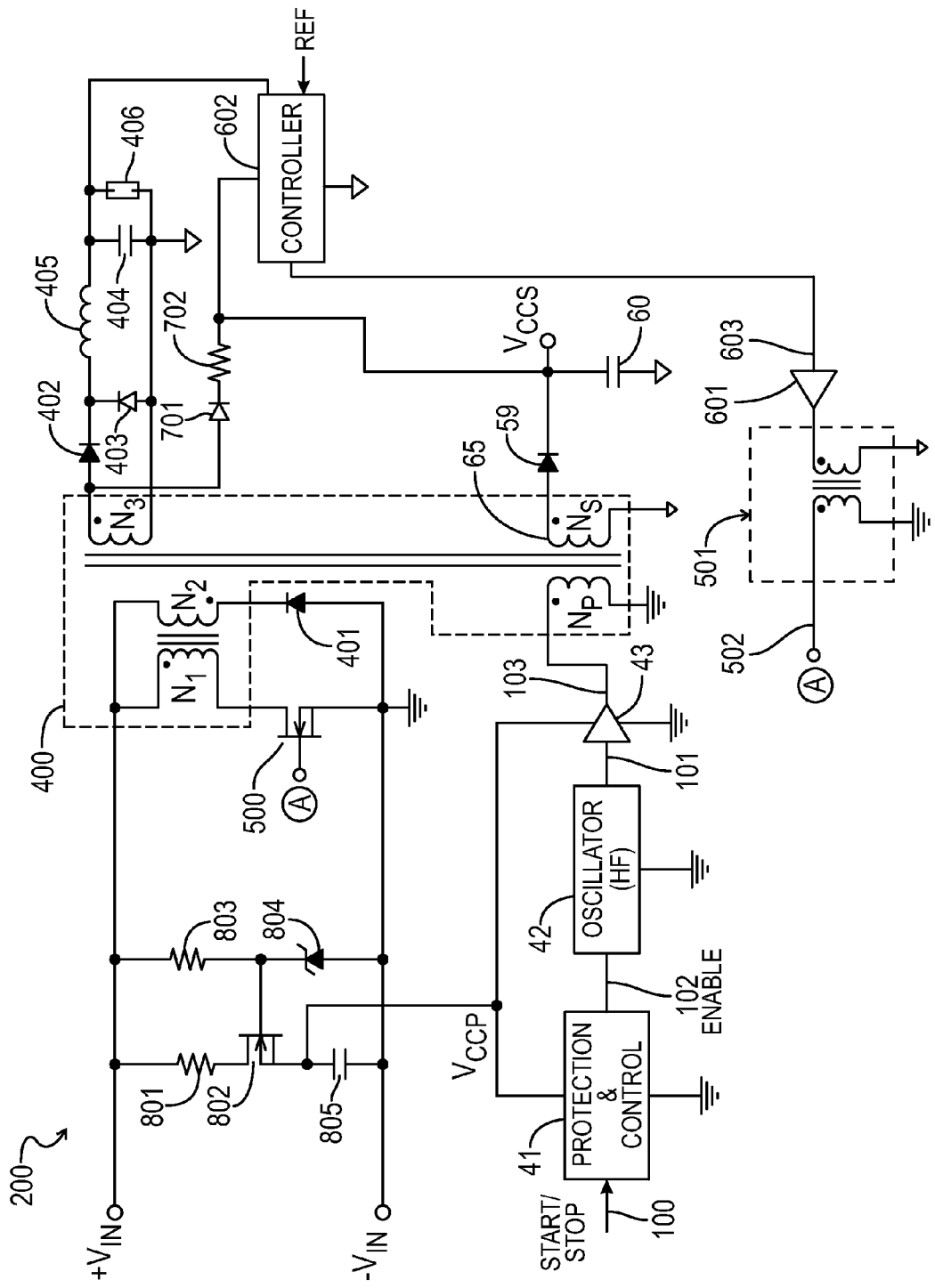
FIG. 2 shows a schematic diagram of an exemplary isolated dc-to-dc converter using the initial bias circuit of FIG. 1.

FIG. 2 shows one exemplary embodiment of an isolated dc-to-dc converter 200 using the initial bias circuit of FIG. 1. The level $V_3$ of voltage $V_{CCS}$ (curve (E), FIG. 3) was chosen to be higher than the start-up voltage of controller 602 and driver 601, respectively. The exemplary power converter of FIG. 2 comprises primary power controllable switch 500, isolation power transformer 400, rectifiers 402 and 403, output inductor 405 and output capacitor 404. Note that synchronous rectifiers, such as MOSFETS, could be used instead of rectifying diodes 402 and 403. The start-up circuit, comprising resistors 801, 803, transistor 802 (shown as a MOSFET, for example), Zener diode 804 and capacitor 805, provide a conventional linear regulator. In the exemplary circuit of FIG. 2, the start-up circuit powers start-up rail $V_{ccp}$ from the $+V_{IN}$ to $-V_{IN}$ input rails. Diode 701 is connected with one end to winding $N_3$ and with its other end to resistor 702. Once converter 200 has started, these two components, together with winding $N_3$, provide bias voltage for control circuit on the output side of the converter, such as shown by controller 602 in FIG. 2. Additional windings having the same function for providing a "run-time" bias voltage as winding $N_3$ can be added either as a separate winding to isolation power transformer 400 or as a separate winding coupled to output inductor 405, either of which is a very common practice. Such additional windings according to the prior art, however, are only useful following converter start-up, and are not useful to provide an initial bias, since the forward converter must already be in operation.

For forward converter operation of the exemplary converter 200 of FIG. 2, when transistor 500 is on, a positive voltage is applied across windings $N_1$ and $N_3$ of power isolation transformer 400. Rectifier diode 402 is forward biased and current flows into inductor 405 and charges capacitor 404, supplying load 406. When transistor 500 is off, the voltages on windings $N_1$ and $N_3$ reverse polarity while the voltage on winding $N_2$ becomes positive and transformer 400 is reset via forward bias diode 401. Here, the reset method is shown as an example only and is unimportant to the inventive bias technique. Reset in such converter can also be accomplished by any other known means, including active reset. With winding $N_3$ having reversed polarity, diode 402 is reverse biased, diode 403 is forward biased and inductor 405 discharges into capacitor 404 and load 406 via diode 403.

The start-up circuit operates in the following manner. Capacitor 805 is charged via transistor 802 and resistor 801 to a voltage equal to the difference between the voltage of Zener diode 804 and the threshold voltage of transistor 802. Resistor 803 provides bias current for Zener diode 804 and transistor 802. The start-up circuit provides voltage $V_{CCP}$, which supplies protection and control circuit 41 on the input side of the converter, and also supplies the initial bias circuit comprising oscillator 42, driver 43, specially placed windings $N_p$ and $N_s$ on isolation transformer 400, diode 59 and capacitor 60.

Operation of exemplary converter 200 in FIG. 2 is initialized with START/STOP signal 100 which activates protection and control circuit 41 which then generates ENABLE signal 102 to initiate oscillator 42. Oscillator 42 generates narrow pulses with repetition rate $T_S$, typically an order of magnitude longer than the pulse duration $t_p$ ($T_S \gg t_p$ of pulse train curve (C) in FIG. 3), which are fed into driver 43. Specially placed winding $N_p$ is driven by driver 43 with pulses 103 similar to pulses 101. When a positive voltage pulse is applied across specially placed windings $N_P$ (the end of winding $N_p$ marked with a dot is positive with respect to input side return $-V_{IN}$), the voltage on winding $N_S$ is also positive (the end with a dot is positive with respect to the other end) and diode 59 is forward biased. Capacitor 60 charges every time a positive voltage is applied across windings $N_P$ and $N_S$ and after time $t=t_1$ reaches its maximum value $V_3$. This value $V_3$ can be chosen to be higher than the start-up voltage for controller 602 by the choice of turns ratio $N_S/N_P$, pulse width $t_d$ and period $T_S$ of pulses 103, and voltage $V_{CCP}$.

Continuing to refer to both FIG. 2 and the curves of FIG. 3, when ENABLE signal 102 is in active state, oscillator 42 is enabled and starts generating pulses 101 for driver 43, which drives the specially placed windings $N_p$ and $N_s$ on isolation transformer 400. The relevant waveforms are shown in FIG. 3. Diode 59 rectifies positive pulses from secondary winding $N_S$, and capacitor 60 charges to a predetermined voltage. Controller 602 is disabled until the voltage on capacitor 60, $V_{CCS}$, reaches its start-up threshold (at time $t=t_1$). After that, controller 602 starts operating and generates drive signal 603 for primary power switch 500 via, in the exemplary converter 200 of FIG. 2, drive transformer 501. As soon as controller 602 starts operating, the voltage on capacitor 60 starts dropping until the voltage on winding $N_3$ is high enough so that diode 701 becomes forward biased and charges capacitor 60 via current limiting resistor 702. The voltage on capacitor 60 drops until it reaches its steady state value $V_4$ at time $t=t_2$, determined by the amplitude of the voltage on winding $N_3$ minus the forward voltage drop across diode 701 and the voltage drop across resistor 702. During time interval $t_3-t_2$, bias voltage is provided from both specially placed windings $N_p$ and $N_s$ and winding $N_3$. Oscillator 42 can be disabled after a predetermined time ($t=t_3$ in FIG. 3) after voltage $V_{CCS}$ reaches its steady state value $V_4$, and bias voltage $V_{CCS}$ for controller 602 and driver 601 can be provided after this time from only winding $N_3$ of power isolation transformer 400.

Figure 4A:
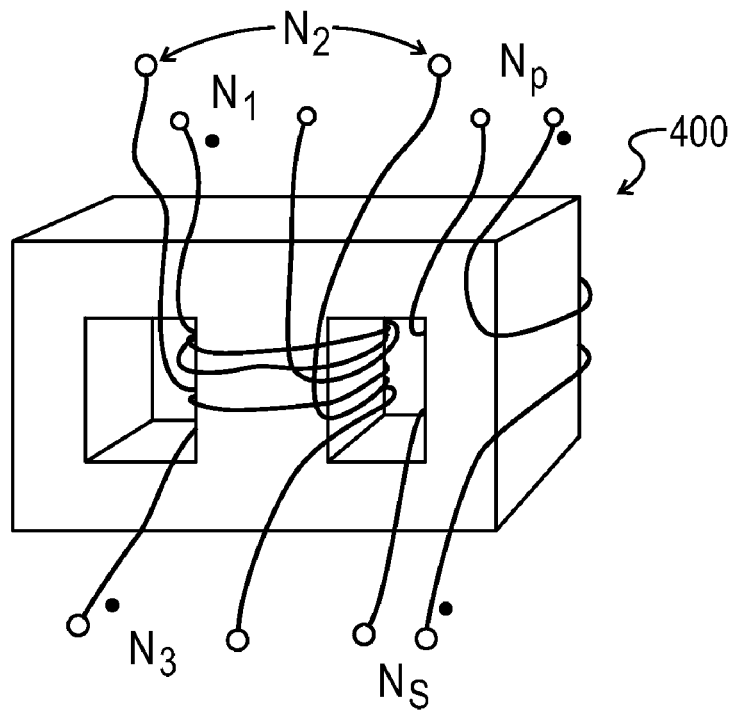
FIG. 4A shows exemplary initial bias windings $N_p$ and $N_s$ wound on an outer leg of a power transformer "E" core.

Several embodiments of the specially placed windings $N_p$ and $N_s$ are now described in more detail. In a first exemplary embodiment as illustrated in the drawing of FIG. 4A, the bias windings, each bias winding including one or more turns, are shown as integrated into a power isolation transformer as two windings on an outer leg of an "E" core. While there are many variations known to those skilled in the art regarding the construction and detailed structure of any particular transformer "E" core, note that as symbolized by the alphabetic character "E", most "E" cores have at least three magnetic paths, or "legs".

Windings $N_1$, $N_2$, and $N_3$ are shown wound around the center leg of the E core as the power windings of a conventional converter, such as of the exemplary converter 200 of FIG. 2. Prior to converter start-up, there is no current in windings $N_1$, $N_2$, and $N_3$. Initial bias power can be developed from high frequency pulses of short duration, such as were shown by pulses 101 for driver 43 (curve (C), FIG. 3), which can drive the specially placed windings $N_p$ and $N_s$ on isolation transformer 400. One advantage over the prior art, is that the magnetizing inductance of the bias windings as shown in FIG. 4A is higher than the magnetizing inductance of the windings of a coreless transformer, resulting in a smaller magnetizing current. Also, the coupling between bias windings, $N_p$ and $N_s$, is significantly better compared to coupling in between windings of the prior art coreless transformer, and therefore the transfer ratio is closer to the actual $N_p/N_s$ turns ratio. By contrast, the coupling between windings in a coreless transformer of the prior art is typically about 0.6, resulting in signal attenuation. Thus, a coreless transformer solution also needs more turns in the secondary winding. Another advantage over the prior art of integrating the initial bias windings onto the core of isolation transformer 400 is that there is no longer a need to use a large area of PCB (in case of coreless transformer) or for an external core (as for example, in the case of separate initial bias transformer).

As described above with respect to the exemplary embodiments of FIG. 1, FIG. 2, and FIG. 3, bias windings $N_p$ and $N_s$ can serve to provide power across the isolation break to power secondary side active electronics at converter start-up. Pulses 101 for driver 43 are typically turned off after start-up when the converter is running normally. In prior art solutions, such as the air core bias transformer, the initial bias section of the converter was largely unused following start-up. By contrast, using the inventive integration of the bias windings into power transformer 400, a secondary bias winding, $N_s$, can now be dual use, remaining active during converter operation. Once the converter is past the start-up phase and into a normal running mode, the normal flux changes associated with power transfer across the power transformer 400 (despite the absence of pulses 101 that initially caused driver 42 to drive winding $N_p$) produce signal output at the bias winding secondary side $N_s$. Therefore, using the inventive bias technique, such as the winding configuration of FIG. 4A, a secondary bias winding, $N_s$, in some embodiments, can in addition to providing initial bias, be used to provide bias to a secondary side circuit during regular operation of the converter. By making "double" use of winding $N_s$, it can be argued that in effect economically, only the slight cost of the primary bias winding $N_p$ is added to the cost of the power transformer to practice the inventive initial bias solution. Thus where winding $N_s$ performs such "double duty", winding $N_s$ can essentially be considered "cost free", since it can be considered part of the converter operating circuit. Also, note that if transformer is a planar type transformer, i.e. windings are implemented on the PCB, no extra cost is added to the transformer, since windings are fabricated by etching patterns into the various layers of the PCB. The only price paid is that the primary bias winding Np will take use PCB space normally used for the windings of main power transformer.

Figure 4B:
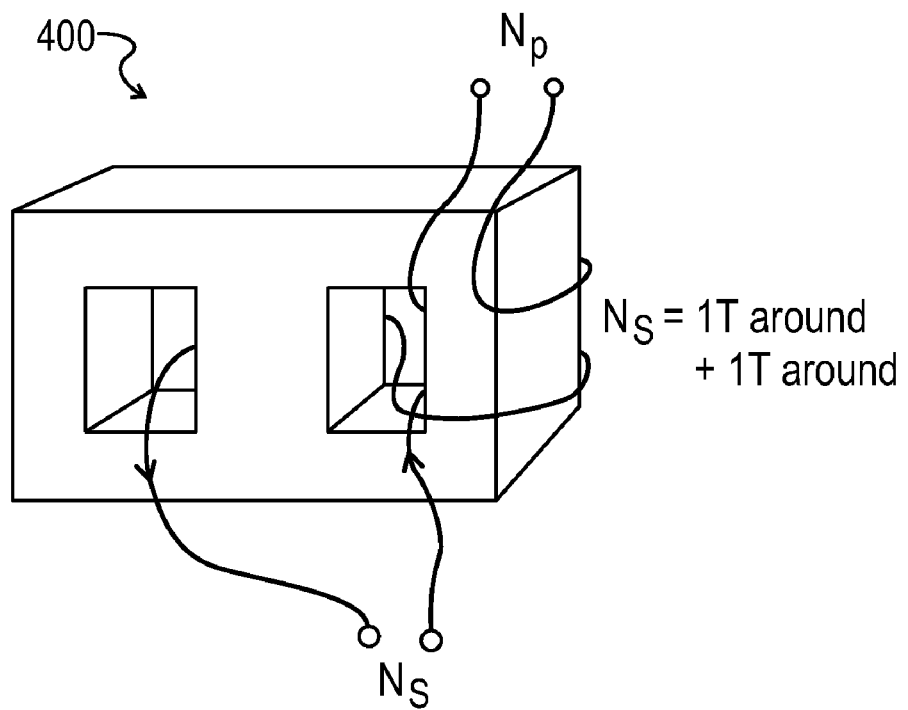
FIG. 4B shows an exemplary initial bias winding $N_s$ wound on both a center and outer leg of a power transformer "E" core.

FIG. 4B shows another embodiment of a power transformer where initial bias where bias windings $N_p$ and $N_s$ are wound on the magnetic core of a power transformer. In FIG. 4B, the primary winding has been wound with one or more turns, the same as in the embodiment of FIG. 4A. The secondary winding $N_s$, however, is wound at least once around the center leg of the magnetic core, in addition to being wound at least once around an outer leg of the core. At start-up, when winding $N_s$ is being powered by bias winding $N_p$, there is little to no effect from the additional $N_s$ turn around the center leg. However, in the "double duty" use of $N_s$ as described above, when the normal operational windings, such as for example, $N_1$, $N_2$, and $N_3$ are active, the voltage available from bias winding $N_s$ can be significantly higher since there is a higher "turns ratio" with the additional changing flux in the center leg caused by the normal operation of the converter following converter start-up.

Figure 5A:
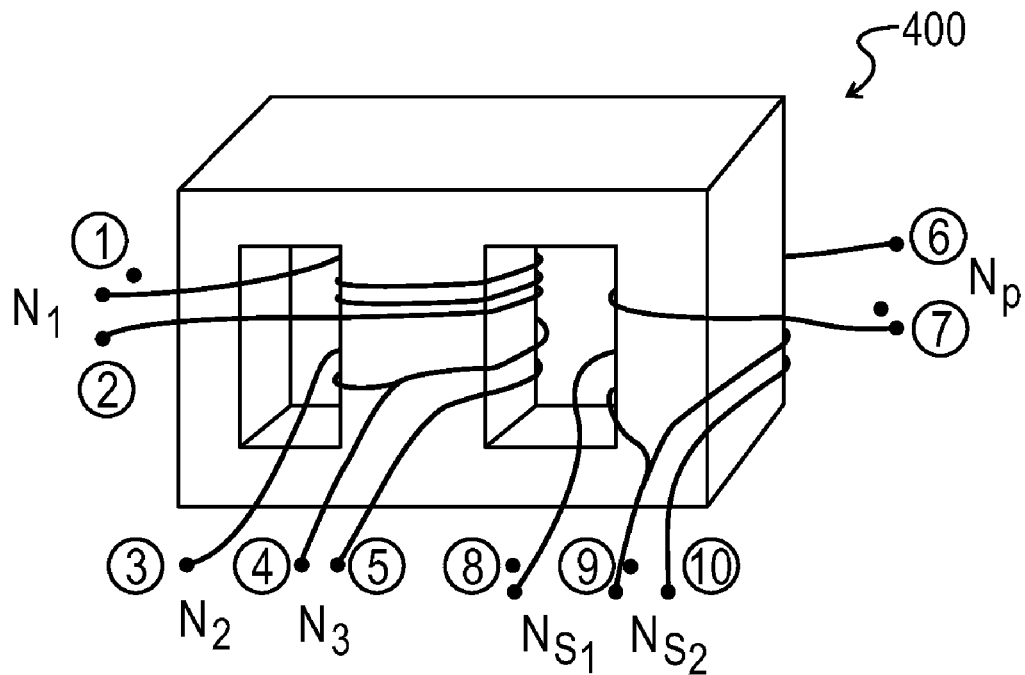
FIG. 5A shows a shows exemplary initial bias windings $N_p$ and center-tapped winding $N_s$ wound on an outer leg of a power transformer "E" core.
Figure 6:
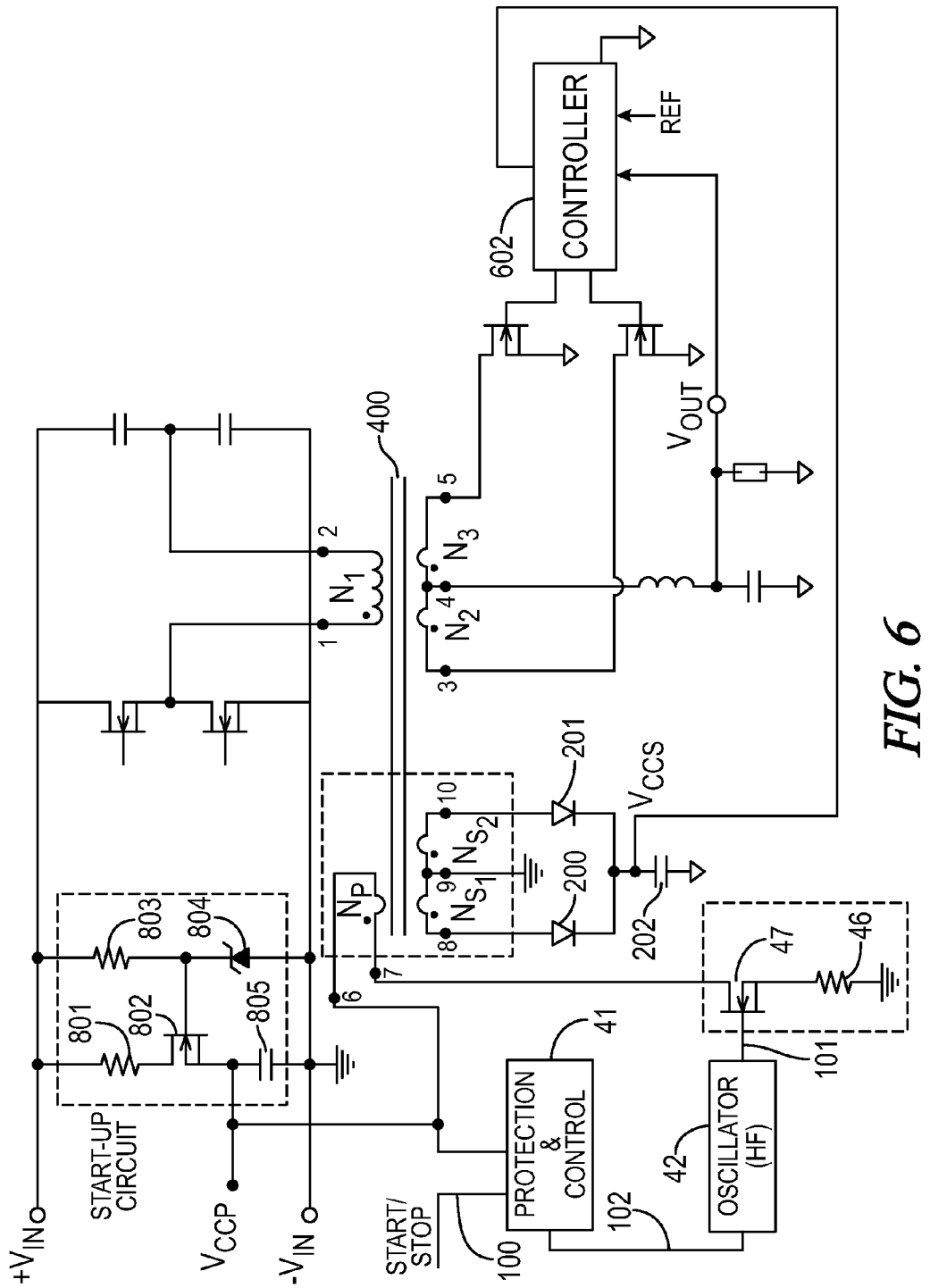
FIG. 6 shows a schematic diagram of an exemplary power converter using initial bias windings according to FIG. 5A or FIG. 5B.

Another embodiment of a power transformer with initial bias windings according to the invention is shown in FIG. 5A. The primary initial bias winding the primary winding has been wound with one or more turns, the same as in the embodiments of FIG. 4A and FIG. 4B. In FIG. 5A, the secondary winding $N_s$, includes at least two turns and a center tap. A secondary winding $N_s$, including a center tap, allows for construction of a more efficient full-wave rectified initial bias circuit as shown in the schematic diagram of the exemplary converter of FIG. 6. The power transformer 400 has been configured to include windings initial bias windings $N_p$ and $N_s$, wound on the magnetic core of a power transformer 400. The secondary side of the initial bias circuit of FIG. 6 can be seen to include a full wave rectifier comprising rectifiers 200 and 201 and filter capacitor 202 to generate a secondary side initial bias voltage, as well as power supply rail $V_{ccs}$ to power controller 602 during normal run-time operation.

Figure 5B:
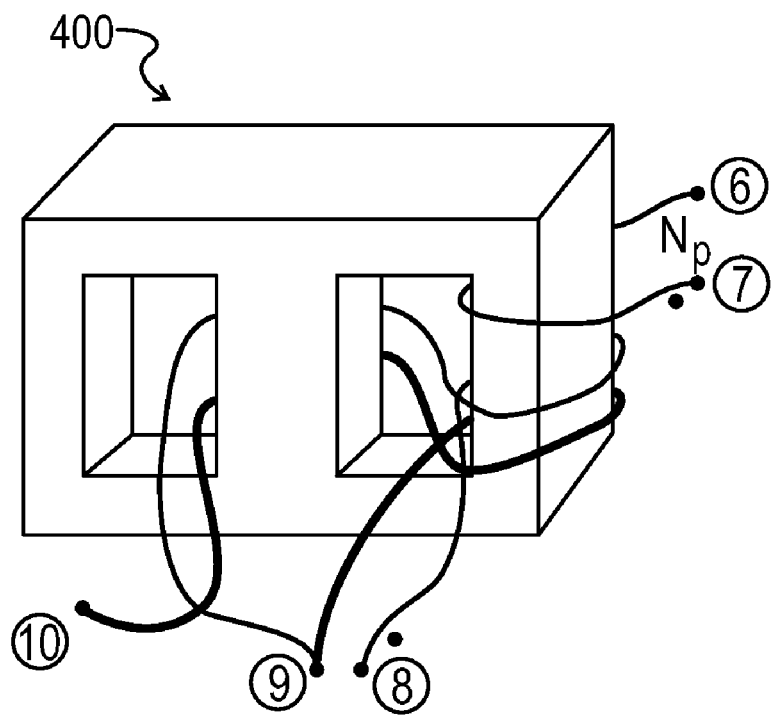
FIG. 5B shows an exemplary initial bias center-tapped $N_s$ winding wound on both a center and outer leg of a power transformer "E" core.

Another embodiment of a power transformer with initial bias windings according to the invention is shown in FIG. 5B. The initial bias primary winding has been wound the same as in the embodiments of FIG. 5A. Either of, or preferably both halves of center-tapped secondary winding $N_s$, are wound at least once around the center leg of the magnetic core, in addition to being wound at least once around an outer leg of the core. Similar to the operation the single initial bias winding as previously described with respect to FIG. 4B, at start-up, when winding $N_s$ is being powered by bias winding $N_p$, there is little to no effect from the additional $N_s$ turn around the center leg. However, in the "double duty" use of $N_s$ as described above, when the normal operational windings, such as for example, $N_1$, $N_2$, and $N_3$ (not shown in FIG. 5B for simplicity) are active, the voltage available from bias winding $N_s$ can be significantly higher since there is a higher "turns ratio" with the additional changing flux in the center leg caused by normal operation of the converter following converter start-up. Initial bias windings of the type illustrated in FIG. 5B are also suitable for use in a power transformer 400 of the exemplary converter shown in FIG. 6.

Note that in the exemplary winding embodiments discussed above, bias windings $N_p$ and $N_s$ are wound, at least in part, on a common leg of the transformer core. Also note that in the exemplary winding embodiments discussed above, at least one of the legs shared in common by bias windings $N_p$ and $N_s$ does not include any of the main power windings which are disposed on other legs of the transformer.

Having described various embodiments of the method and apparatus for providing initial bias and enable signaling across the isolation barrier of a power converter by use of specially placed windings on a power transformer core, characteristics of the high frequency pulses can now be discussed in more detail. For typical transformer cores and configurations suitable for use with various embodiments of the invention, the frequency of high frequency pulses 101 is preferably at least about 500 kHz and typically having a pulse width (duration) of, for example, of about 100 nanoseconds. More generally, in practical realization for pulse repetition frequencies equal to, or below, about 1 MHz, high frequency pulses 101 can have a duty cycle of about equal to or less than 25%. At higher repetition frequencies, such as for a 1 MHz to 2 MHz or higher frequency of high frequency pulses 101, the duty cycle can be higher, e.g. 50%. One limitation for maximum pulse width is the inductance of the initial primary bias winding. For example, an initial primary bias winding having more turns can support longer pulse widths (i.e. higher duty cycle). Note however, that increasing the number of initial primary bias winding turns can cause the transformer to be larger and occupy more space on a printed circuit board, and/or cause an increase in the size of the transformer core used.

Note that, as will be understood by those skilled in the art, transformer 601 and the initial bias windings can be configured for push-pull, half-bridge or in a full-bridge topology (not shown in the FIGs.) or their variations. It is also contemplated that a full bridge initial bias circuit topology can more efficiently use the transformer as well as reduce or eliminate voltage spikes at the driver. The inventive method and apparatus can also be applied to other circuit topologies.

In any of the embodiments where windings from the initial bias circuitry, such as the exemplary embodiments of $N_s$ as described above, $N_s$ can also serve to control the operation of active components of the switch-mode power supply, such as active output rectifier switches. Using signals generated by winding $N_s$, active components can be caused to operate in phase with the main switching frequency. Higher or lower multiples of the switching frequency as used anywhere in the power supply can also be made phase stable with regard to the frequency of the power signal being transferred across the power transformer from the power input to the load on the output side of the power converter. Moreover, where multiple switch-mode converters are desired to operate in phase synchronous operation, an analog or digital synchronization signal can be made available to be connected between switch-mode converters to provide phase synchronize of a plurality of switch-mode converters. It is unimportant whether such connections are made by a daisy-chain or STAR connection topology, or by some combination of the two.

In many switch-mode power converters, the basic switching frequency is determined by analog timing or analog resonances, such as typically by a RC time constant related to an off-the-shelf converter pulse width modulation ("PWM") integrated circuit. A typical PWM based converter might vary +/−15% over an expected power converter operating temperature range. For example, a 400 KHz converter might actually operate between about 340 KHz and 460 KHz. Therefore all of the circuits within the converter, including various types of filters, must meet performance specifications over the approximately 120 KHz range of expected operating frequencies.

Where timing is controlled by a microcomputer, such as an embedded computer, or by a relatively stable digital timing circuit, the accuracy of the basic switch-mode converter system frequency or clock can be made more stable over time and temperature. For example, using microcomputer based timing, it is practical to achieve a tolerance of +/−2.5%, or +/−10 KHz for the 400 KHz center frequency example above for an operating range of 390 KHz to 410 KHz over temperature. One significant cost impact of a more accurate converter operating frequency is that all of the components within the converter, including power transformer magnetics can be specified and selected for operation over a smaller range of frequencies. Such designs over smaller ranges of normal operating frequency can reduce the cost of both the power converter magnetics, including especially the power transformer, as well as other analog components of the converter.

Figure 7:
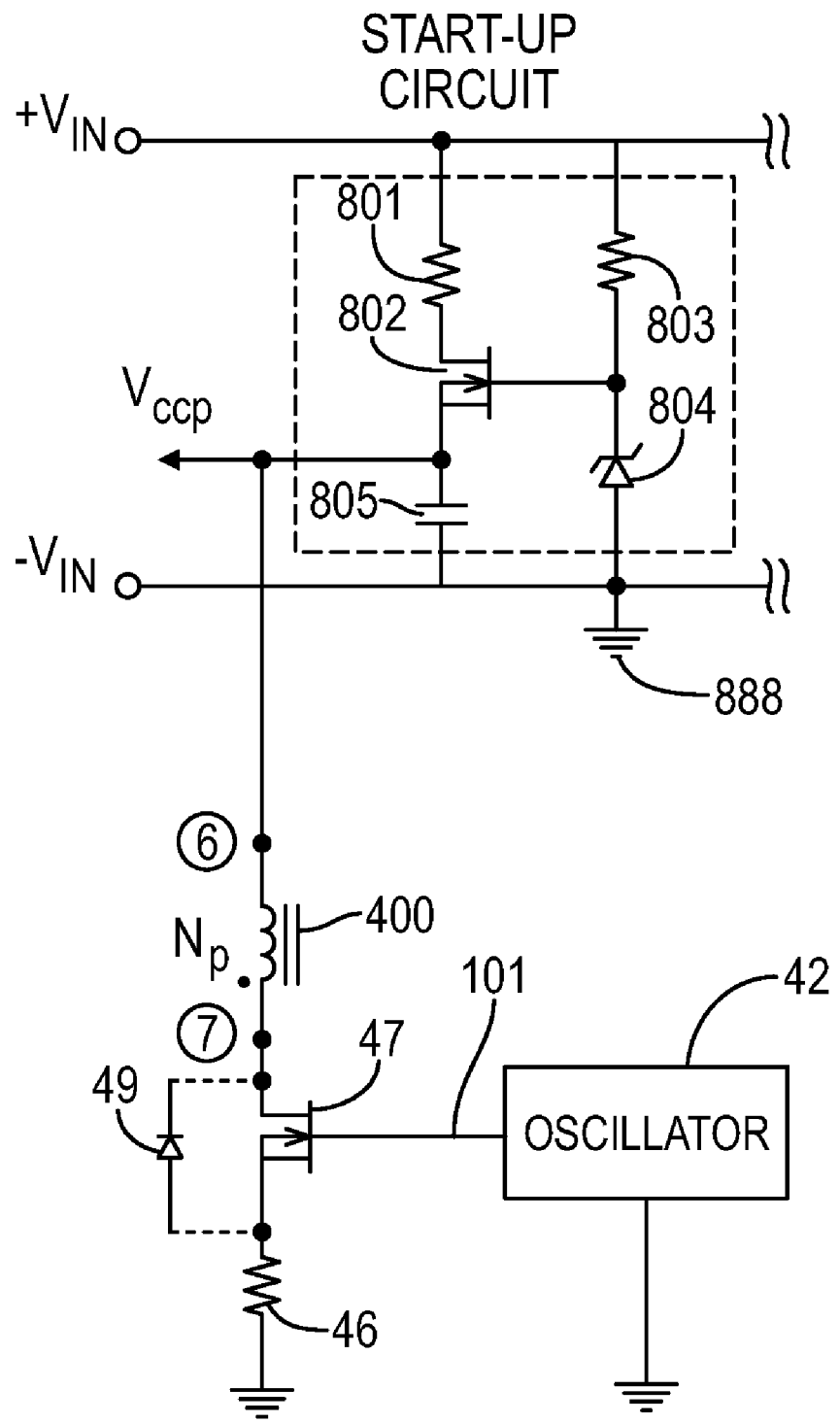
FIG. 7 shows a partial schematic diagram of the primary side of an exemplary power converter including an initial bias primary winding, driver, and oscillator.

We now turn to FIG. 7 showing one exemplary embodiment of a primary side initial bias circuit. $+V_{in}$ and $-V_{in}$ represent the input rails or input voltage source that powers a converter such as the exemplary converters shown in FIG. 2 and FIG. 6. The source of $+V_{in}$ and $-V_{in}$ is unimportant to the invention. Components 801, 802, 803, 804, and 805 provide a standard low drop out linear regulator to generate a primary bias voltage $V_{ccp}$ with respect to the primary side common 888. In a basic embodiment of an initial bias circuit, $V_{ccp}$ provides a power to the primary side of the initial bias circuit including, initial bias winding $N_p$, MOSFET 47 with its anti-parallel body diode 49, resistor 46, and oscillator 42 having oscillator output 101. Note that the initial bias circuit is referenced to $-V_{in}$ which, also shown in FIG. 7 as common 888. The operation of this basic circuit is the same as has been described above with respect to FIG. 1 as illustrated by the waveforms of FIG. 3.

Figure 8A:
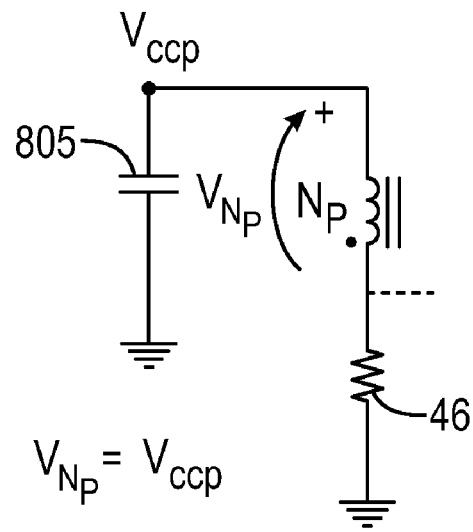
FIG. 8A shows an equivalent diagram of the initial bias circuit of FIG. 7 during power converter start-up.

FIG. 8A shows a schematic diagram of the equivalent circuit of the initial bias circuit of FIG. 7, when MOSFET 47 is conducting during a pulse $t_p$ (FIG. 3) to generate voltage on winding $N_s$ for the initial bias phase of the converter start-up.

Figure 8B:
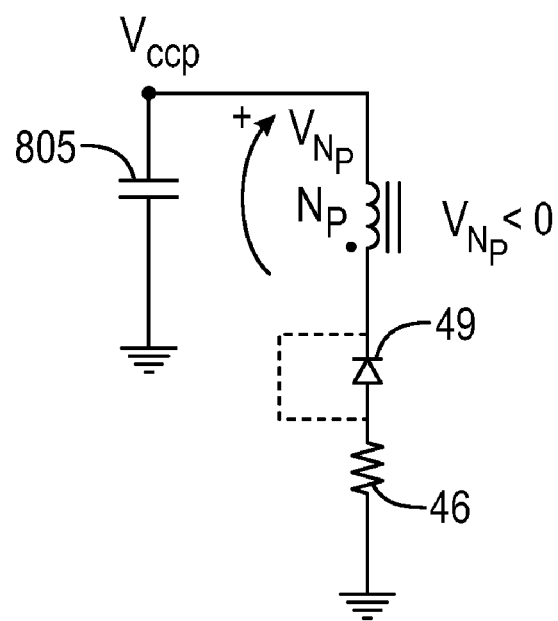
FIG. 8B shows an equivalent diagram of the initial bias circuit of FIG. 7 during power converter normal operation.

FIG. 8B shows how winding $N_p$ can also be used to provide a half wave rectifier that can be used to provide primary bias voltage $V_{ccp}$. In the embodiments of an initial bias circuit discussed heretofore, winding $N_p$ was only used during converter startup, typically to generate secondary side bias voltage $V_{ccs}$. While describing the embodiments of FIG. 4B and FIG. 5B above, it was shown how the secondary side initial bias windings $N_s$ can serve dual roles for both initial startup as well as providing run time power. At first, it would appear that primary winding $N_p$ is less suitable for such dual use because of the hardwired active MOSFET driver 47. However, surprisingly, as shown in the equivalent circuit diagram of FIG. 8B, the body diode 49 (a reverse protection diode of a transistor), can provide a half wave rectifier that can be used to provide primary bias voltage $V_{ccp}$, once the power converter is past start up and into a normal running mode of operation. Once running, winding voltage $N_p$ can be rectified by body diode 49 and filtered by capacitor 805 to provide primary side bias voltage $V_{ccp}$. As indicated by the arrow labeled $V_{ccp}$ in FIG. 7, primary voltage $V_{ccp}$, can be used elsewhere to power circuits (not shown in FIG. 7) on the primary side of the converter power isolation break used during normal converter run mode operation. Note that since $V_{ccp}$ is now sourced in run mode by a switch-mode source, sourced from the converter power transformer, there can be an increase in efficiency over the linear regulator sourced power taken directly from the input rails during converter startup as was described above with respect to FIG. 7. Thus, according to some embodiments of the inventive initial bias technique, $N_p$ can also become a "dual use winding" and as such lower further the cost of the initial bias circuit as well as improve the overall power converter electrical efficiency.

Figure 9A:
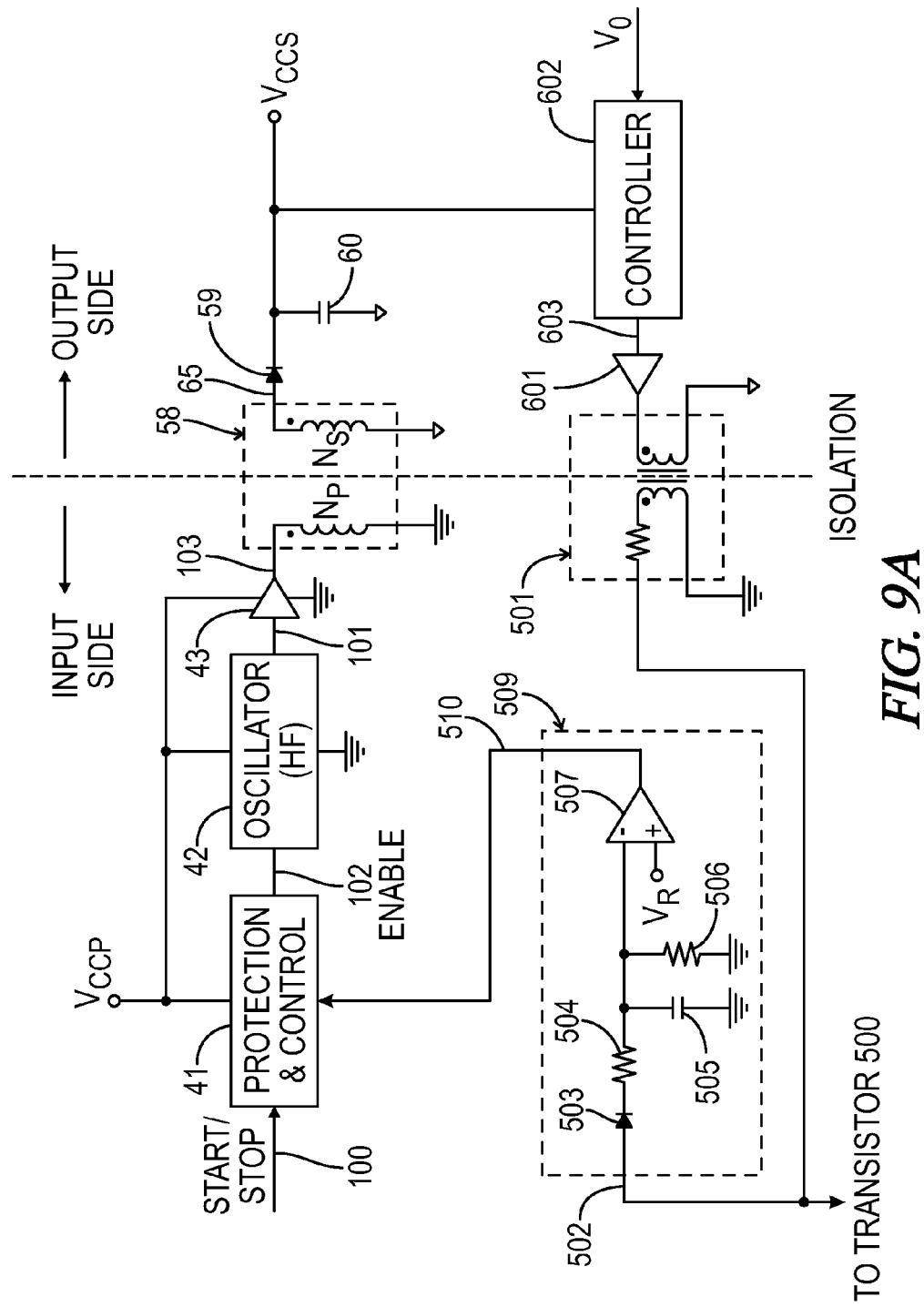
FIG. 9A shows an embodiment of the invention where the bias oscillator is disabled based on the amplitude and width of positive pulses applied to a transistor.

FIG. 9A shows another embodiment of the invention. In FIG. 9A, the time at which oscillator 42 is disabled is determined from drive signal 502, based on the amplitude and width of positive pulses applied to transistor 500 (see FIG. 2). In this manner oscillator 42 is disabled before predetermined time t=$t_3$ very soon after controller 602 commences operating and generating drive signal 502, which may be in the form of short pulses. One possible circuit implementation is shown in FIG. 9A, where additional circuit 509, comprising diode 503, resistor 504, capacitor 505 and resistor 506, receives voltage pulses 502 from the gate of transistor 500. The voltage on capacitor 505 depends on the amplitude and duration of voltage pulses 502, the capacitance of capacitor 505, and resistance of resistors 504 and 506. The voltage on capacitor 505 is compared with reference voltage $V_R$ in comparator 507 and, when the voltage on capacitor 505 exceeds reference voltage $V_R$, comparator 507 generates logic low signal 510 on its output which is fed into protection and control circuit 41 and oscillator 42 becomes disabled. Note that even when the circuit of FIG. 9A is used, it is advantageous to disable oscillator 42 after predetermined time t=$t_3$ if controller 602, and consequently the converter, is not operating or the voltage on winding $N_3$ (FIG. 2) is not big enough to provide bias voltage $V_{CCS}$. Such conditions could be, for example, if over-current protection is activated, in which case the converter may operate with a very small duty cycle and consequently very narrow voltage pulses 502 will not trip comparator 507 (FIG. 9A) and narrow pulses on winding $N_3$ (FIG. 2) will not be enough to provide the minimum voltage on capacitor 60 needed for operation of controller 602.

It is very common in practice that in event of activating either some or all protection (such as short circuit, over-current, over-voltage and over-temperature, for example), a converter enters so-called hiccup mode. In this mode the converter tries to re-start with a predetermined period of operation in the event the converter is automatically shut down due to the existence of a protection condition. Protection and control circuit 41 is designed to generate ENABLE signal 102 which can be a pulse train rather than the single pulse waveform (ENABLE signal, curve B, FIG. 3). In the embodiments show, the duration of each pulse of the ENABLE signal can be, for example, less than 20% of the pulse period of the ENABLE signal (less than a 20% duty cycle). For example, the pulse duration can be about 5 msec with an inactive duration of about 95 msec, for a total pulse period of about 200 msec. The status of signal 510 from circuit 509 (shown in FIG. 8A) determines if protection and control circuit 41 will generate ENABLE signal 102 as a pulse train. Whenever the ENABLE signal is active, capacitor 60 will be charged to voltage level $V_3$, controller 602 will be enabled and the converter will attempt to start again. If the converter does not start, or if it shuts down again due to a protection condition, circuit 509 detects that there is no drive signal 502 for transistor 500 (FIG. 2) and generates logic low signal 510 which initiates an inactive period in protection and control circuit 41. Oscillator 42 will be inactive for the remaining 95 msec. At the end of the inactive period, control and protection circuit 41 generates logic high ENABLE signal 102 and the converter tries to re-start. It is also possible by using the described embodiment to have on/off control referenced to the output side of the converter. Note that the duration of active and inactive periods are given as examples only, and can be adjusted according to any particular application.

Figure 9B:
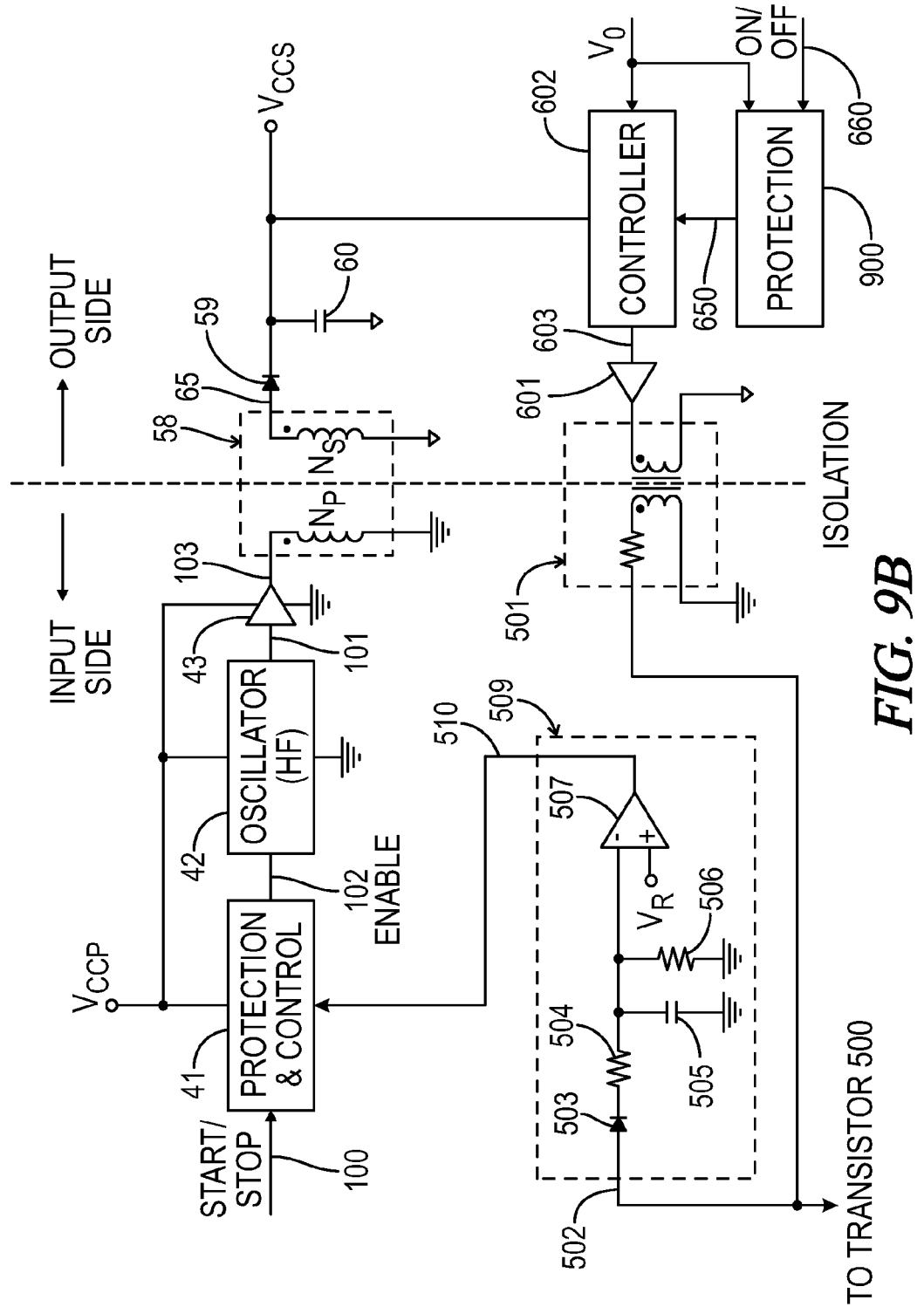
FIG. 9B shows an embodiment of the invention where the converter is enabled by a signal referenced to the output side of the converter.

FIG. 9B shows an embodiment of the invention where the converter can be enabled with an ON/OFF signal 660 which is referenced to the output side of the converter. A circuit, such as protection circuit 900 can enable/disable controller 602 with signal 650, such as in response to ON/OFF signal 660. In order to have on/off control from the output side, START/STOP signal 100 is active, thus enabling protection and control circuit 41 which generates ENABLE signal 102 as a pulse train rather than as a single pulse waveform, as described above in case of the hiccup mode of operation. Note that the initial bias circuit also provides voltage $V_{CCS}$ for protection circuit 900. When ON/OFF signal 660 becomes active and controller 602 is enabled, the converter enters its normal mode of operation as described above. Note that the inactive period of ENABLE signal 102 determines maximum turn-on time of the converter.

While the exemplary converters used in the examples are forward converters, the invention is not limited to any particular converter topology. The converter can also be an ac-to-dc, dc-to-dc, or dc-to-ac converter.

It should also be understood that the foregoing embodiments are exemplary for the purpose of teaching the inventive aspects of the present invention that are covered solely by the appended claims and encompass all variations not regarded as a departure from the intent and scope of the invention. All such modifications as would be obvious to one of ordinary skill in the art are intended to be included within the scope of the following claims and their equivalents.

While the present invention has been particularly shown and described with reference to the preferred mode as illustrated in the drawing, it will be understood by one skilled in the art that various changes in detail may be affected therein without departing from the spirit and scope of the invention as defined by the claims.

I claim:

1. A switch-mode power converter including a bias circuit, comprising:
    a pair of input side power terminals configured to accept power from a power source;
    a pair of output side power terminals configured to provide power to a load;
    a power converter power transformer comprising
        a magnetic core,
        at least one input side power winding wound on the magnetic core and coupled to an input side of the switch mode power converter,
        at least one output side power winding wound on the magnetic core and coupled to an output side of the switch mode power converter,
        said power converter power transformer configured to provide a galvanic break to isolate said input side power terminals from said output side power terminals of said switch-mode power converter;
    at least one controllable power switch coupled to the input side power winding;
    a control circuit disposed on said output side of said switch-mode power converter, the control circuit functional to provide a drive signal to activate the controllable power switch;
    an initial bias primary winding wound on said magnetic core;
    an initial bias secondary winding also wound on said magnetic core, wherein said initial bias secondary winding shares at least one magnetic path in common with said initial bias primary winding;
    a driver coupled to said initial bias primary winding, said driver powered by said power source, said driver configured to drive said initial bias primary winding with high frequency pulses when enabled by an enable signal before the controllable power switch is activated by the control circuit;
    a rectifier coupled to said initial bias secondary winding to provide rectified pulses; and
    a capacitor coupled to said rectifier, said capacitor configured to smooth said rectified pulses, wherein said rectifier and said capacitor are configured to provide a voltage to power said control circuit during a power converter start-up.

2. The switch-mode power converter of claim 1, wherein at least a selected one of said initial bias primary winding and said initial bias secondary winding is configured to provide a source of electrical power for at least one circuit of said switch-mode power converter during operation of said power converter after said start-up.

3. The switch-mode power converter of claim 2, wherein said initial bias secondary winding is configured to provide electrical power to at least one circuit of said switch-mode power converter on said output side of said power converter.

4. The switch-mode power converter of claim 2, wherein said initial bias primary winding is configured to provide electrical power to at least one circuit of said switch-mode power converter on said input side of said power converter.

5. The switch-mode power converter of claim 4, wherein rectification is provided by a reverse protection diode of a transistor in said driver.

6. The switch-mode power converter of claim 1, wherein both of said initial bias primary winding and said initial bias secondary winding are configured to provide electrical power to at least one circuit of said switch-mode power converter after said start-up.

7. The switch-mode power converter of claim 1, wherein said magnetic core of a power converter power transformer comprises an E shaped core having a center leg and two outer legs.

8. The switch-mode power converter of claim 7, wherein said initial bias primary winding and said initial bias secondary winding are both wound on the same outer leg of said E shaped core; and said input side power winding and said output side power winding are wound on the center leg of said magnetic core.

9. The switch-mode power converter of claim 8, wherein said initial bias secondary winding is additionally wound around another leg of said E shaped core.

10. The switch-mode power converter of claim 9, wherein said another leg of said E shaped core comprises the center core leg of said E shaped core.

11. The switch-mode power converter of claim 1, wherein said driver further comprises an oscillator configured to generate high frequency pulses, wherein said driver, when enabled, drives said initial bias primary winding in response to an output of said oscillator.

12. The switch-mode power converter of claim 1, wherein said bias circuit is further configured to receive an ON/OFF signal initiated on said input side, and said bias circuit is configured to disable said initial bias primary winding in response to an OFF state of said ON/OFF signal.

13. The switch-mode power converter of claim 1, wherein said bias circuit is further configured to receive an ON/OFF signal initiated on said output side, and said bias circuit is configured to disable said initial bias primary winding in response to an OFF state of said ON/OFF signal.

14. The switch-mode power converter of claim 1, wherein said high frequency pulses comprise a frequency of less than or equal to about 1 MHz and a duty cycle of less than or equal to 25%.

15. The switch-mode power converter of claim 1, wherein said high frequency pulses comprise a frequency above 1 MHz and a duty cycle of less than or equal to 50%.

16. The switch-mode power converter of claim 1, further comprising a sensing and control circuit coupled to an input side of said bias circuit, said sensing and control circuit configured to detect when said converter is not operating, said sensing and control circuit configured to commence a shorter active period where said control circuit located on said output side is enabled followed by a longer inactive period.

* * * * *